(12) United States Patent
Jeffrey

(10) Patent No.: US 8,662,565 B2
(45) Date of Patent: Mar. 4, 2014

(54) SPRINT CAR WING

(76) Inventor: Lynton Jeffrey, Prairie City, IA (US)

(*) Notice: Subject to any disclaimer, the term of this patent is extended or adjusted under 35 U.S.C. 154(b) by 55 days.

(21) Appl. No.: 13/524,046

(22) Filed: Jun. 15, 2012

(65) Prior Publication Data

US 2013/0334838 A1    Dec. 19, 2013

(51) Int. Cl.
*B62D 35/00* (2006.01)

(52) U.S. Cl.
USPC .......................................... 296/180.1

(58) Field of Classification Search
USPC ...................................... 296/180.1
See application file for complete search history.

(56) References Cited

U.S. PATENT DOCUMENTS

| | | | | |
|---|---|---|---|---|
| 4,558,898 A | * | 12/1985 | Deaver | 296/180.1 |
| 5,061,007 A | * | 10/1991 | Simpson | 296/180.5 |
| 6,183,041 B1 | * | 2/2001 | Wilson | 296/180.1 |
| 6,338,524 B1 | * | 1/2002 | Wu | 296/180.1 |
| 2008/0061596 A1 | * | 3/2008 | Brown et al. | 296/180.1 |
| 2010/0090497 A1 | * | 4/2010 | Beckon | 296/180.5 |

OTHER PUBLICATIONS

"World-SprintCar-Guide.com—Sprint Car Wings", retrieved on Sep. 19, 2012 from the Internet: www.world-sprintcar-guide.com/sprint-car-wings.html, 2006-2012 (3 pages).

* cited by examiner

*Primary Examiner* — H Gutman
(74) *Attorney, Agent, or Firm* — McKee, Voorhees & Sease, P.L.C.

(57) ABSTRACT

A sprint car wing or wing assembly is provided. The wing, which is known as a top wing, includes a wing belly and left and right side boards attached generally perpendicular to the wing belly. The wing belly includes a non-uniform thickness along its width to create downforce for the car. The right and left side boards are positioned mostly below and above the wing belly to aid in the creation of downforce, and also to provide the car with a sideforce during cornering. The side boards include a flexible surface, which will curve or bow to create greater sideforce. The side boards also house mounting frames of the wing assembly to mount the side boards to the wing belly.

20 Claims, 5 Drawing Sheets

SPRINT CAR WING

FIELD OF THE INVENTION

The present invention relates generally to car wings. More particularly, but not exclusively, the present invention relates to the top wing assembly of a sprint car type race car, and a method of making the same.

BACKGROUND OF THE INVENTION

Sprint car wings are one of the defining features of the race cars. The wings, more specifically known as the top wing, are generally five foot by five foot, and are mounted above the head of the driver of the car. The wings provide downforce and safety for the cars. Furthermore, sprint cars may include smaller front wings or nose wings to help balance the race car and to keep the front of the car planted to the track.

The top wings act like upside down aircraft wings, creating downforce instead of lift. A wing generates downforce due to the air pressure differential between the top and bottom surfaces of the wing. Due to the shape and angle of attack of the wing, the air below the wing travels faster than that above, meaning that the air pressure on the underside of the wing will be lower. The speed of the air above the wing is either not changed or slowed by the shape of the wing, meaning the pressure of the air above the wing is higher than the air flowing under the wing. The downforce is created as the high pressure area on top of the wing is drawn to the low pressure area under the wing forcing the wing down. As the speed of the wing moving through the air is increased, so is the downforce. The horizontal portion of the top wing, also known as the wing belly, is also generally angled to most efficiently create the downforce. Therefore, an angle of around 20-30° may provide the best downforce.

Top wings also include left and right side boards, which are also known as tip plates. The side boards have multiple advantages. The boards ensure that the high air pressure area moving over the top surface of the wing is not allowed to spill over the sides and into the low pressure area under the wing and vice versa. If the pressures were allowed to mix, a whirling vortex would be produced, which affects the efficiency of the wing by reducing downforce, increasing drag and in some circumstances causing lift. Another important job performed by the tip plates is to create what is known as sideforce. This is the force that acts towards the inside of the race track. To create sideforce the left tip plate is positioned higher above the wing than the right tip plate, this is to allow the high pressure air on top of the wing to push more on the left side of the wing. The right tip plate is positioned lower below the wing than the left tip plate, causing the low pressure area pull to increase on the right tip plate.

Typically, the side boards are single-layered boards that include a kicker or turn out at the rear section. The turn outs aid in the turning and the downforce of the wings. The side boards are attached to the wing belly at approximately 90° by the use of angled struts between the interior side of the boards and the wing belly. These struts can create turbulence, drag, and bad air flow around the wing. Furthermore, the wing belly has been a uniform shape and thickness on both the right and left sides of the belly. To change the amount of downforce and the location of the same, the belly would have to be tilted by wing mount, which could affect the airflow around other portions of the wing.

There are also various rules and regulations that the wings must comply with. The rules designate the width of the belly, width of the side boards, length of the kickers, angle of the connections, etc. The rules are in place to try to increase the safety of the races, while also keeping the cars in a somewhat even playing field.

Therefore, there is a need in the art for a top wing assembly for a sprint car type racing car that increases the speed and safety of the cars, while also complying with the rules and regulations of the races and racing series.

SUMMARY OF THE INVENTION

It is therefore a primary object, feature, and/or advantage of the present invention to provide an apparatus that overcomes the deficiencies in the art.

It is another object, feature, and/or advantage of the present invention to provide an improved sprint car wing having a wing belly of non-uniform thickness across the width of the wing to provide selective downforce.

It is yet another object, feature, and/or advantage of the present invention to provide an improved sprint car wing that does not include external struts to connect the side boards to the wing belly.

It is still a further object, feature, and/or advantage of the present invention to provide an improved sprint car wing that complies with the rules and regulations of the racing series, yet that has an enlargeable surface area for sideforce.

It is still another object, feature, and/or advantage of the present invention to provide an improved sprint car wing that provides increased downforce to the car.

It is another object, feature, and/or advantage of the present invention to provide an improved sprint car wing that improves the turning of the car.

It is yet another object, feature, and/or advantage of the present invention to provide an improved sprint car wing that reduces air disturbance and turbulence to the top wing assembly.

It is still another object, feature, and/or advantage of the present invention to provide an improved sprint car wing that includes a flexible material on one side of the side boards to create a curved portion to increase sideforce.

These and/or other objects, features, and advantages of the present invention will be apparent to those skilled in the art. The present invention is not to be limited to or by these objects, features and advantages. No single embodiment need provide each and every object, feature, or advantage.

According to one aspect of the present invention, a sprint car wing is provided. The sprint car wing includes a wing belly having a front edge, rear edge, and extending between a right and left end. Left and right side boards are attached at the left and right ends of the wing belly. The front edge of the wing belly has a greater thickness at the right end than at the left end, and the thickness of the front edge gradually lessens from the right end to the left end along the front edge.

According to another aspect of the present invention, a sprint car wing is provided. The sprint car wing includes a wing belly having a front edge, rear edge, and extending between a right and left end. Left and right side boards are attached at the left and right ends of the wing belly, with the left and right side boards each comprising a top edge, bottom edge, interior surface, and exterior surface. The interior and exterior surfaces of the left and right side boards are spaced from each other, and he exterior surface of the right side board and the interior surface of the left side board comprise a flexible material.

According to yet another aspect of the present invention, a sprint car wing is provided. The sprint car wing includes a wing belly having a front edge, rear edge, and extending between a right and left end. Left and right side boards are attached at the left and right ends of the wing belly, with the left and right side boards each comprising a top edge, bottom edge, interior surface, and exterior surface. A right side board frame is housed between the exterior and interior surfaces of the right side board, and the frame is attached to the right edge of the wing belly. A left side board frame is housed between the exterior and interior surfaces of the left side board, and the frame is attached to the left edge of the wing belly.

DETAILED DESCRIPTION OF THE PREFERRED EMBODIMENTS

Figure 1:
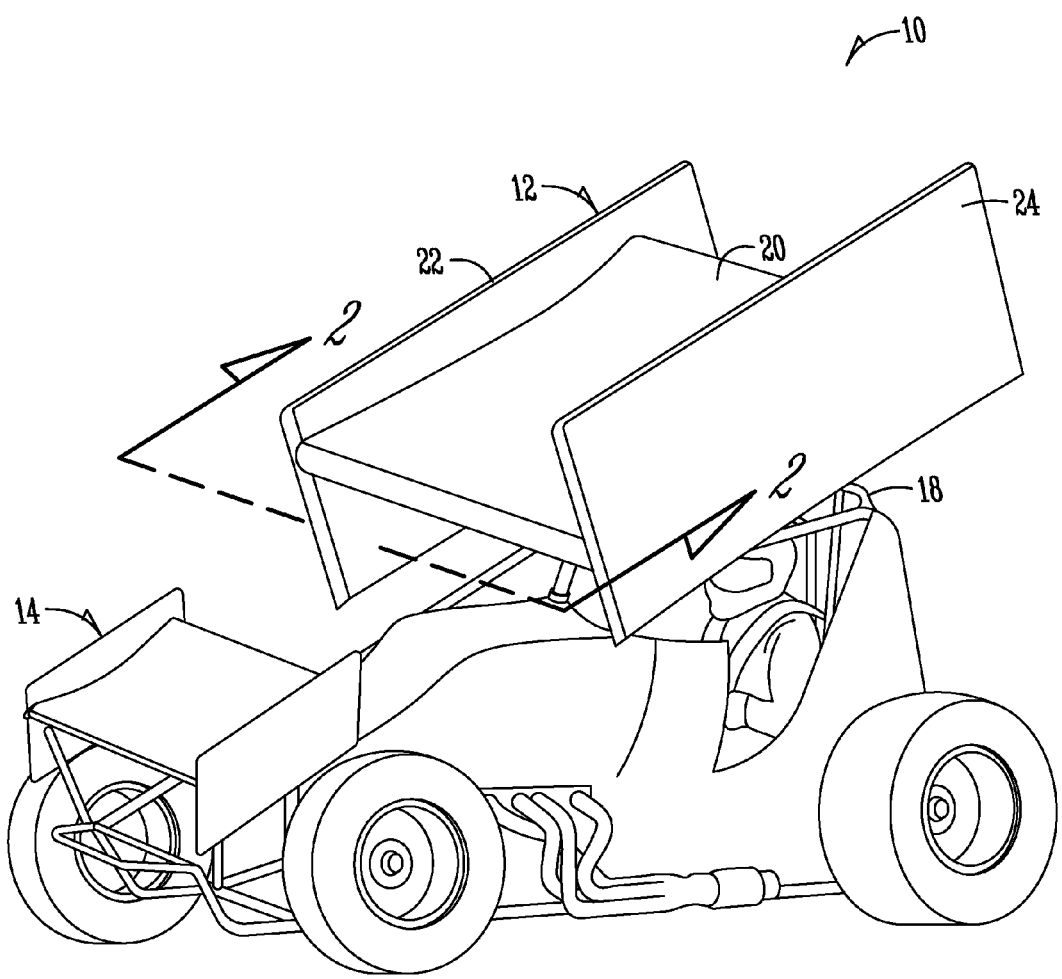
FIG. 1 is a perspective view of a sprint car type race car having a top wing assembly and a nose assembly.

FIG. 1 is a perspective view of a sprint car type race car 10 having a top wing assembly 12 and a nose or front wing assembly 14. The top wing assembly includes generally a wing belly 20 and left and right side boards 22, 24. The nose wing is similar in construction to the top wing. The wings are mounted to the roll cage 18 of the sprint car 10, with the top wing 12 being mounted via a wing mount 16. The wing belly 20 acts like an upside down aircraft wing, creating down force instead of lift. The wing assembly 12 generate down force due to the air pressure differential between top and bottom surfaces of the wing. Due to the shape and angle of a tact of the wing, the air below the wing travels faster than that above, meaning that its air pressure will be lower. The speed of the air above the wing is either not changed or slowed by the shape of the wing, meaning the pressure of the air above the wing is higher than the air flowing under the wing. The down force is created as the high pressure area on top of the wing is drawn to the low pressure area under the wing, forcing the wing down. As the speed of the wing moving through the air is increased, so is the down force. The left and right side boards 22, 24 are used to ensure the high air pressure area moving over the top surface of the wing is not allowed to spill over the sides into the low pressure under the wing and vice versa. Another important job performed by the plates is to create what is known as side force. The side force is increased by having the right side board 22 positioned lower than the left side board 24. The side boards also aid in straightening a sprint car 10 as the car corners during a race.

Figure 2:
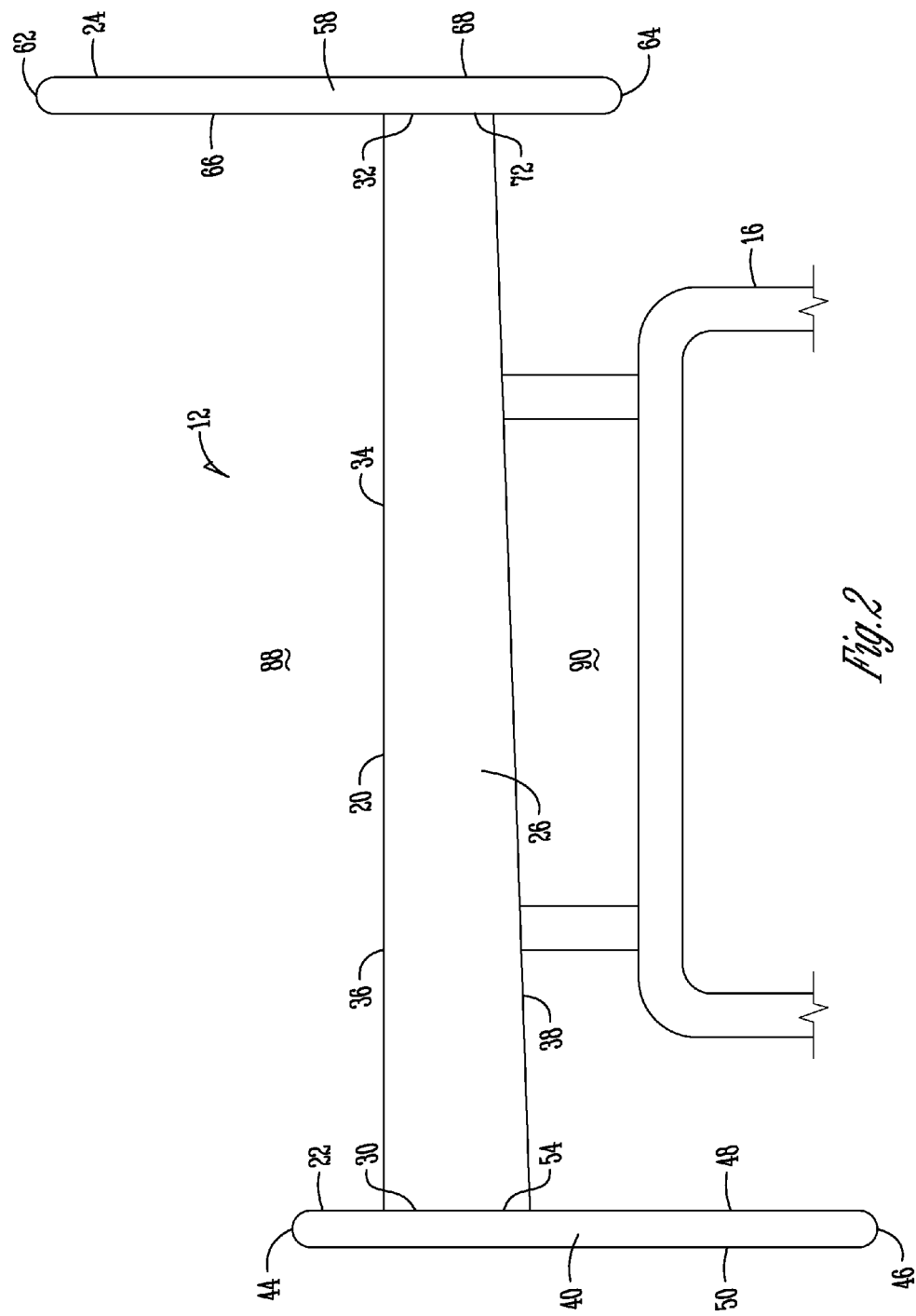
FIG. 2 is front elevation view of the top wing of the present invention.

FIG. 2 is a front elevation view of a top wing 12 that may be mounted to a sprint car 10. As discussed previously, the top wing or wing assembly 12 includes a wing belly 20 and left and right side boards 22, 24. The wing belly has a plane that is generally horizontal in relation to the ground. However, the wing belly 20 may also be angled relative the ground to create more or less down force. The wing belly has front and rear edges 26, 28, right and left ends 30, 32 with a wing belly body 34 therebetween, as well as top and bottom surfaces 36, 38. The right side board 22 is attached generally at the right end 30 of the wing belly. Likewise, the left side board 24 is positioned at the left end of the wing belly. As shown in FIG. 2, the wing belly 20 has a non-uniform thickness moving from the right side board 22 to the left side board 24. In an embodiment, the wing belly may have a thickness varying from 9" on the right side to 8" or even 7" on the left side. The non-uniform thickness of the wing belly aids in creating more down force on one or more portions of the sprint car 10. The varying thickness of the core maximizes side panel area and also maximizes the extremities of the wing's width. The non-uniform thickness increases side force and down force to increase leverage.

By making the left hand side or right hand side of the wing belly 20 thicker than the other, the wing 12 is able to tilt or lean left or right to maximize the wing's extremities to make the hole that is punched through the air larger, resulting in additional force to the car 10 cross-sectionally increasing the car's traction via mechanical leverage applied by the wing 12 and aerodynamic down force created by manipulating the pressure base on difference shapes used from right to left or left to right. Thus, the present invention contemplates that either side of the wing belly 34 may be thicker. Having the wing of a different thickness creates a differing of height in either the mounting system 16 or the thickness of the wing when varied left to right or right to left. This non-uniform thickness changes the angles of the side boards 22, 24 in order to maximize or change the extremities of the width of the wing 12 by tilting the wing side to side. The side boards 22, 24 are affixed generally 90° to the plane of the wing belly 34. As the wing 12 is leaned or tilted in relation to the roll cage 16, it moves the extremities away from center and parallel such that the extremities are at a minimum.

Figure 3:
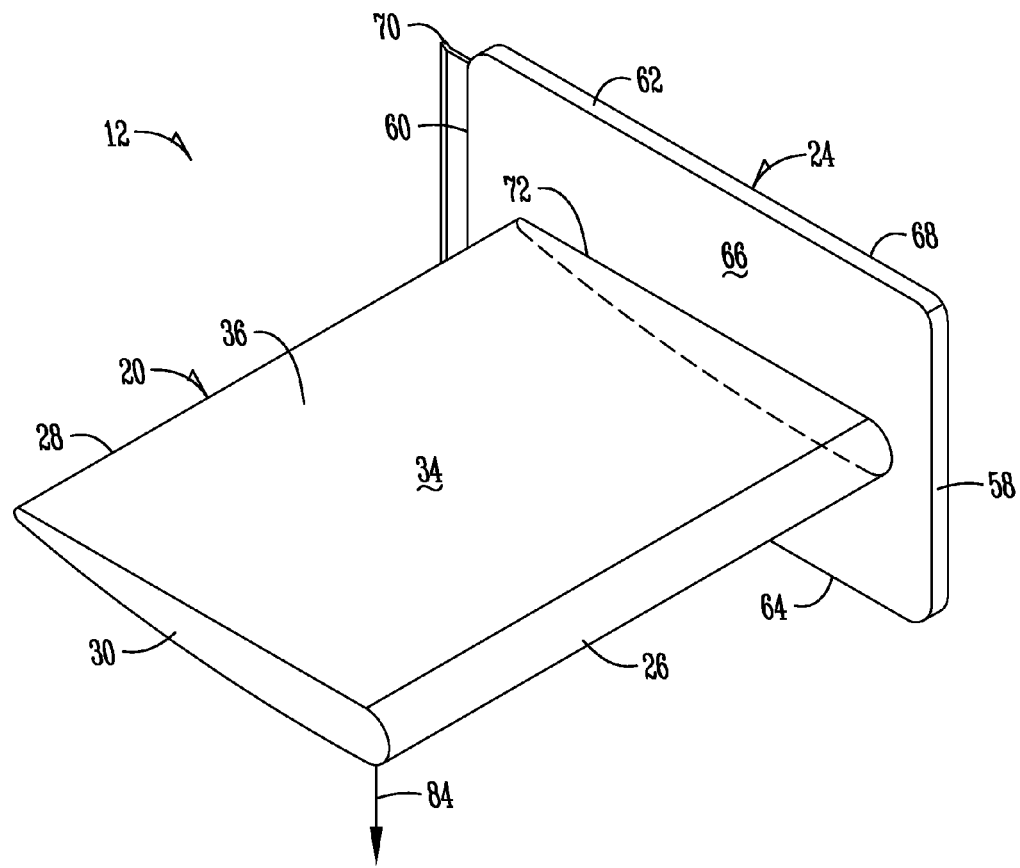
FIG. 3 is a perspective view of a wing belly and left side board of the top wing of the present invention.

FIG. 3 is a perspective view of the wing belly 34 and the left side board 24 of the top wing 12 of the present invention. The right side board 22 has been removed in order to illustrate one benefit of the non-uniform thickness of the wing belly 34. The non-uniform thickness of the wing belly 34 maximizes not only the extremities of the wing 12, but also may allow the designation of down force at one particular portion of the wing. For example, the applied force to a corner of the car 10 may satisfy conditions, using different shapes can move the force to a corner to help balance the car's handling characteristics or to balance additional forces created by maximizing the extremities. For example, the leading edge drag caused by having a thicker portion of the wing belly front edge 26 might be a compensating measure to help the car 10 steer while applying more force to the left rear portion of the side board 24. The force on the side board causes the right front wheel of the car to pull off the ground. Therefore, having a thicker portion at the front right portion of the wing belly may aid in creating more down force at that portion, as is shown by the arrow 84 in FIG. 3. Therefore, the side boards may experience more side force, while the wing belly creates more down force. The two forces compensate for one another to allow for a greater speed while cornering the car, but also more safety by keeping the front wheels at or near the ground during cornering of the car.

Figure 4A:
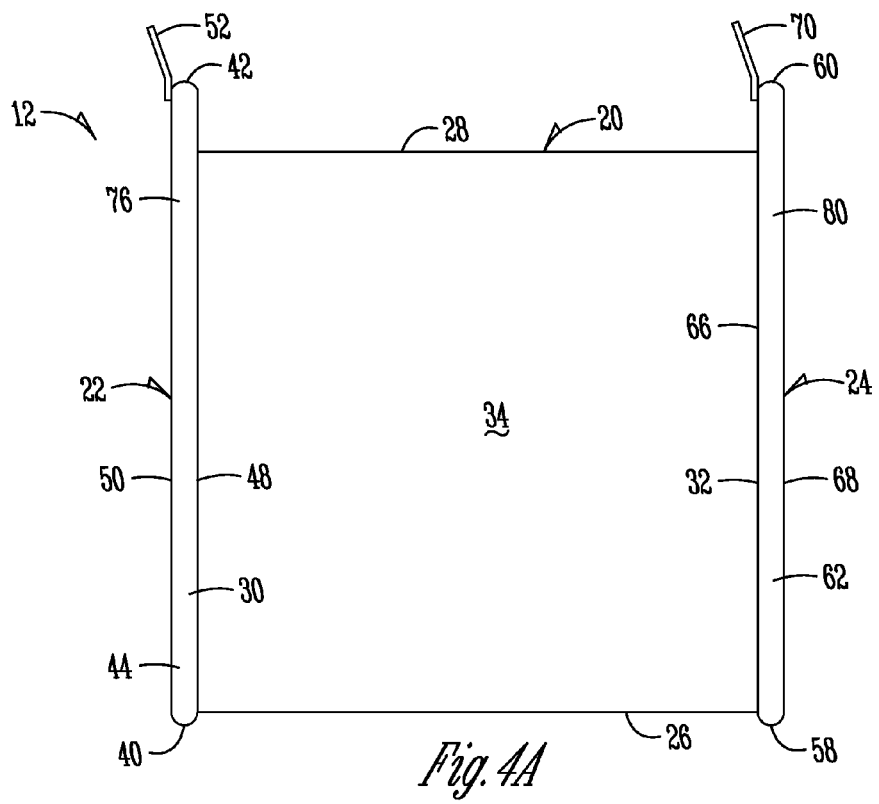
FIGS. 4A and 4B are top elevation views of the top wing according to an embodiment of the present invention.
Figure 4B:
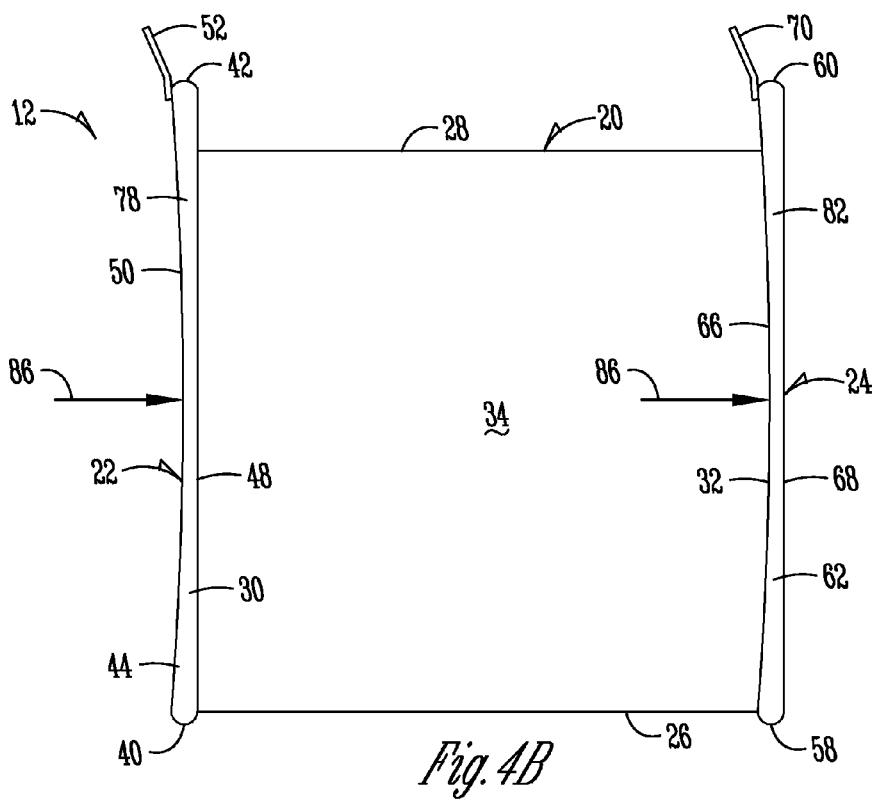

FIGS. 4A and 4B are top elevation views of the top wing 12 according to an embodiment of the present invention. As discussed previously, the right side board 22 is attached at the right end 30 of the wing belly and the left side board 24 is attached at the left end 32 of the wing belly. According to an embodiment of the present invention, the side boards 22, 24 include interior and exterior surfaces that are spaced from one another. For example, the right side board 22 includes a front edge 40, rear edge 42, top edge 44, and bottom edge 46. The edges are formed from an interior surface 48 and an exterior surface 50. The surfaces 48, 50 may also be referred to as skins. The skins create a space therebetween. Furthermore, the right interior surface 48 will include an aperture 54 for attaching the right side board 22 to the wing belly 34.

The left side board 24 will include a front edge 58, rear edge 60, top edge 62, and bottom edge 64. The left side board 24 also includes interior surface 66 and an exterior surface 68, which are spaced apart from one another. Therefore, the left and right side boards may be similar in construction. Therefore, the left side board also includes a left aperture 72 for attaching the left side board to the wing belly. In addition, as shown in the figures, the left and right side boards may include a right turn out 52 and left turn out 70. The left and right turn outs may also be referred to as kickers, wicker bills, or gurney flaps. The turn outs are pieces of material attached at the rear edges 42, 60 of the left and right side boards to aid in controlling the pressure and control of the race car 10.

The interior and exterior surfaces of the side boards comprise a flexible material, such as aluminum, plastic, or the like. Therefore, when the car 10 is cornering, the exterior surface or skin 50 of the right side board 22 and the interior surface 66 of the left side board 24 will curve or bellow in opposite direction of the turn. This creates a convex shape relative to the interior surface 48 of the right side board and the exterior surface 60 of the left side board. Thus, the distance between the two skin surfaces will collapse with the surfaces potentially even coming in contact with one another.

The flexing of the skins under the side force, which is shown in FIG. 4B by the arrows 86, increases the surface area of the side board and also maximizes the total width of the wing while maintaining a maximum width as is determined by a racing organization or rule making body. As the turn outs 52, 70 may only extend 1¼", the flexing of the surfaces will allow for an additional amount of space between the non-flexing skin and the edge of the turn out. The amount of increase in distance may be as much as another 1¼", which will create a maximum distance of 2½" from the non-flexing skin to the edge of the turn out. This increased distance will provide many advantages to the race car, including handling of corners and general traction of the car. It should be appreciated that any material used with race cars may be used for the interior and exterior surfaces of the side boards and the invention is not limited to those provided. Furthermore, the width between the interior and exterior surfaces of the side boards, as well as the dimensions given for turn outs and general width of the wing may vary according to any rule change by the governing bodies.

Figure 5:
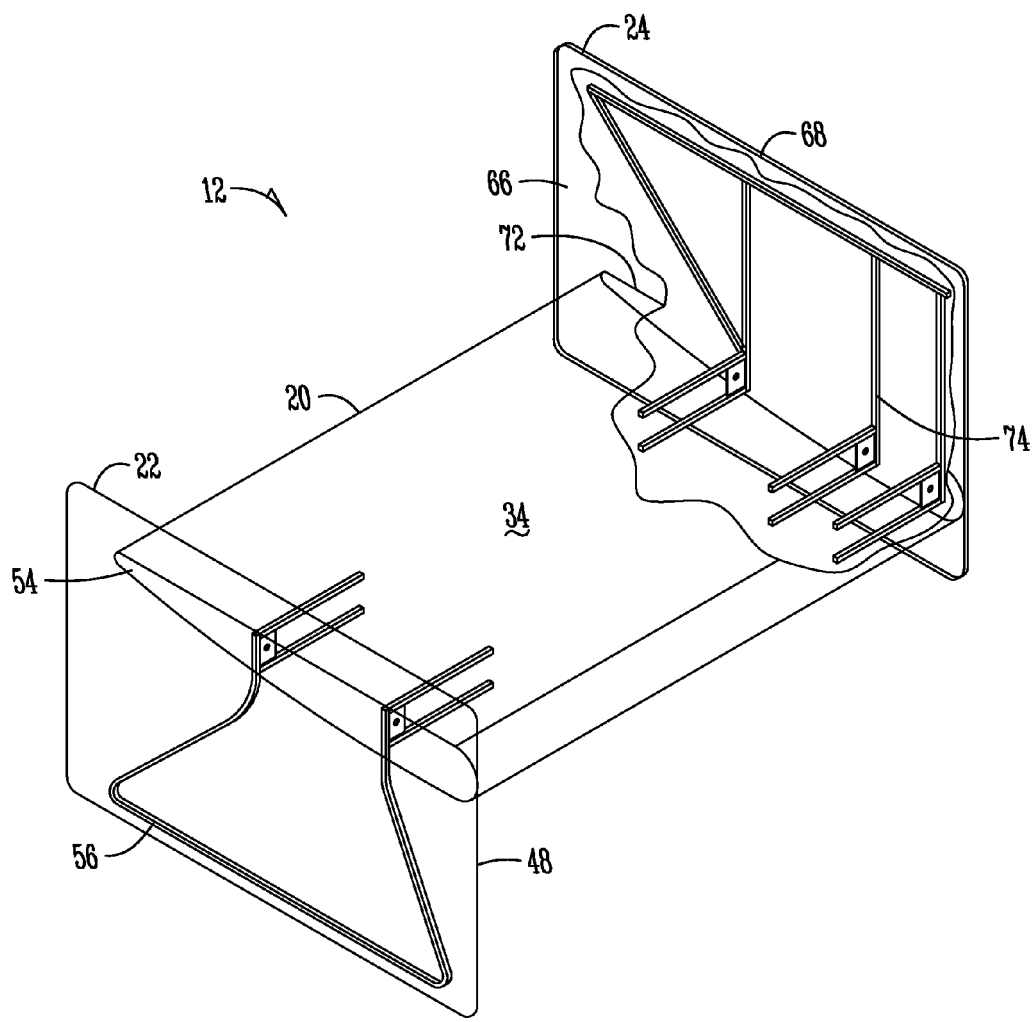
FIG. 5 is a partial sectional and perspective view of the top wing of a sprint car according to another embodiment of the present invention.

FIG. 5 is a partial sectional and perspective view of the top wing 12 of sprint car 10 according to another embodiment of the present invention. FIG. 5 shows generally a method of attaching the left and right side boards 22, 24 to the wing belly 34. Previously, the side boards were attached to the wing belly via struts or other external support members. The support members were required in order for the wing to sustain the high amounts of side force and down force experienced during a race. However, these struts created turbulence and drag that could slow a race car during the race period. Therefore, an aspect of the present invention includes internal frames 56, 74 positioned between the interior and exterior surface of the side boards 22, 24. As mentioned above, an aspect of the present invention includes having the side boards with interior and exterior surfaces or skins. While one advantage of the skins is allowing one of the surfaces to flex or bellow to create more surface area, another advantage may be to house the frame for attaching the side board to the wing belly.

Thus, a support structure, which may be tubing, is placed between the interior and exterior surfaces 48, 50 of the right side board 22 and attached internally to the wing belly 34. Likewise, the left side board 24 may include a frame assembly 74 positioned between the interior and exterior surfaces or skins 66, 68 of the left side board. Furthermore, as shown in FIG. 5, as the right side board 22 is positioned with most of the side board below the wing belly 34, the frame will likewise be positioned generally below the wing belly 34. Alternatively, because the left side board 24 is positioned generally above the wing belly, much of the frame will also be positioned above the wing belly 34. The frame assemblies include members that extend through the apertures in the right interior surface 48 and the left interior surface 66 and extend into the wing belly 34 for support. As the frame assemblies are housed completely within the side boards and wing belly, they will not have any external forces act upon them directly such that they will create turbulence or drag.

The frames can be manufactured inside the 1¼" of the side boards and encased by the skins of the side board. The materials of the frame can be made from aluminum, steel, or titanium square or round tubing. Other materials and shapes of tubing may be considered to be part of the present invention. Thus, the frames encased by the skins of the side boards will eliminate the use of struts and will increase the efficiency of the wing by causing less turbulence to the main belly while also reducing drag and bad air to the underside of the wing belly 34.

The embodiments of the present invention have been set forth in the drawings and Specification and although specific sizes and materials have been described, these are used generally in the descriptive sense only and are not used for purposes of limitation. Therefore, the present invention contemplates many variations to the invention which are still considered to be part of the scope of the invention. For instance, any dimensions given regarding the present invention may vary according to rule changes or other limitations. The specific mention of materials may also vary according to external forces, such as price, weight, and the like. The invention is not to be limited by the embodiments described. Therefore, the shapes of the wing, including but not limited to the wing belly, side boards, and frame system may also vary as once skilled in the art would contemplate.

What is claimed is:

1. A sprint car wing, comprising:
 a wing belly having a front edge, rear edge, and extending between a right and left end;
 left and right side boards attached at the left and right ends of the wing belly;
 wherein the front edge of the wing belly having a greater thickness at the right end than at the left end, and the thickness of the front edge gradually lessening from the right end to the left end along the front edge.

2. The sprint car wing of claim 1 wherein the left and right side boards are attached at generally 90° to the wing belly.

3. The sprint car wing of claim 1 wherein each of the left and right side boards comprises a front edge, rear edge, top edge, bottom edge, interior surface, and exterior surface.

4. The sprint car wing of claim 3 wherein the right side board is attached to the right edge of the wing belly near the top edge of the interior of the right side board.

5. The sprint car wing of claim 4 wherein the left side board is attached to the left edge of the wing belly near the bottom edge of the interior of the left side board.

6. The sprint car wing of claim 5 wherein the interior and exterior surfaces of the right side board are spaced from one another, and the exterior surface comprises a flexible material.

7. The sprint car wing of claim 6 wherein the interior and exterior surfaces of the left side board are spaced from one another, and the interior surface comprises a flexible material.

8. The sprint car wing of claim 7 further comprising a right side board frame housed between the exterior and interior surfaces of the right side board, and the frame attached to the right edge of the wing belly.

9. The sprint car wing of claim 8 further comprising a left side board frame housed between the exterior and interior surfaces of the left side board, and the frame attached to the left edge of the wing belly.

10. The sprint car wing of claim 9 further comprising a right side board turn out at the rear edge of the exterior of the right side board and a left side board turn out at the rear edge of the interior of the left side board.

11. A sprint car wing, comprising:
a wing belly having a front edge, rear edge, and extending between a right and left end;
left and right side boards attached at the left and right ends of the wing belly, the left and right side boards each comprising a top edge, bottom edge, interior surface, and exterior surface;
wherein the interior and exterior surfaces of the left and right side boards are spaced from each other; and
wherein the exterior surface of the right side board and the interior surface of the left side board comprise a flexible material.

12. The sprint car wing of claim 11 further comprising a right side board frame housed between the exterior and interior surfaces of the right side board, and the frame attached to the right edge of the wing belly.

13. The sprint car wing of claim 12 further comprising a left side board frame housed between the exterior and interior surfaces of the left side board, and the frame attached to the left edge of the wing belly.

14. The sprint car wing of claim 13 wherein the interior surface of each of the right and left side board include an aperture, and wherein the side boards are attached to the wing belly at the apertures.

15. The sprint car wing of claim 14 wherein the left side board frame and the right side board frame extend from between the interior and exterior sheets, through the apertures, and into the wing belly.

16. The sprint car wing of claim 11 wherein the front edge of the wing belly having a greater thickness at the right end than at the left end, and the thickness of the front edge gradually lessening from the right end to the left end along the front edge.

17. The sprint car wing of claim 11 further comprising a right side board turn out at the rear edge of the exterior of the right side board and a left side board turn out at the rear edge of the interior of the left side board.

18. A sprint car wing, comprising:
a wing belly having a front edge, rear edge, and extending between a right and left end;
left and right side boards attached at the left and right ends of the wing belly, the left and right side boards each comprising a top edge, bottom edge, interior surface, and exterior surface;
a right side board frame housed between the exterior and interior surfaces of the right side board, the frame attached to the right edge of the wing belly; and
a left side board frame housed between the exterior and interior surfaces of the left side board, the frame attached to the left edge of the wing belly.

19. The sprint car of claim 18 wherein the exterior surface of the right side board includes a first position generally parallel to the interior surface, and a second position wherein the exterior surface is generally convex to the interior surface.

20. The sprint car of claim 19 wherein the interior surface of the left side board includes a first position generally parallel to the exterior surface, and a second position wherein the interior surface is generally convex to the exterior surface.

* * * * *